Patented June 17, 1941

2,246,374

UNITED STATES PATENT OFFICE 2,246,374

MINERAL OIL SULPHONATES, THEIR PURIFICATION AND FRACTIONATION

Charles J. Lohman and Latimer D. Myers, Cincinnati, Ohio, assignors to Emery Industries, Inc., Cincinnati, Ohio, a corporation of Ohio No Drawing. Application September 22, 1939, Serial No. 296,114

18 Claims. (Cl. 260—504)

This invention relates to the purification of mahogany sulphonates.

The primary object of the invention has been to provide a process for purifying crude or commercial mahogany sulphonates so as to improve the emulsifying properties of these materials, their color or their ability to carry water into oil solutions.

Mineral oil sulphonic bodies are obtained as by-products resulting from the treatment of petroleum oil with sulphuric acid or sulphur trioxide, the principal product of the production being technical or medicinal white oil. In this treatment two distinct types of mineral oil sulphonic bodies are obtained, the one type called the A layer mineral oil sulphonate being predominantly oil soluble, and the other type, the B layer mineral oil sulphonate being predominantly water soluble. The B layer mineral oil sulphonates are obtained, as disclosed in the Divine Patent No. 1,438,101, from the sludge which is drawn off after each acid treatment. The A layer mineral oil sulphonic bodies are obtained by extracting the residual oil which has been treated repeatedly with sulphonic acid with water soluble organic solvents, for instance, as disclosed in the Petroff Patent No. 1,087,888 and Humphrey Patent No. 1,286,179.

The A layer sulphonates are termed mahogany sulphonates. These materials in the crude, commercial condition contain anywhere from 15 to 60% of entrained oil, inorganic salts, mainly sodium sulphate and sodium hydroxide and carbonate. The crude mahogany also will contain up to 2 to 3% and sometimes as much as 10% of sludge sulphonates of the water soluble type entrained from the B layer. While such crude mahogany sulphonates are useful, per se, for a number of purposes, their color is bad, they exhibit only limited emulsifying properties by virtue of the impurities which they contain, and it is relatively impossible to obtain clear oil solutions of them.

The contamination in crude commercial sulphonates may be divided roughly into two general classes, inorganic salts and compounds on the one hand, and organic impurities, principally water soluble sulphonates, on the other. Perhaps largely by reason of the fact that the nature of the petroleum from which they are derived never has been fully understood, the chemical nature of the organic impurities has not been fully ascertained. Aside from the inorganic salts, however, it is believed that crude or commercial mahogany sulphonates are comprised of an intermixture of a number of different sulphonic bodies and that the presence of some of these bodies detracts from the commercial utility of the others. The process of the present invention is adapted both for the removal of the inorganic salts and impurities and for the removal of those organic components which detract from the useful properties of sulphonates which are in the crude or commercial condition.

This invention is predicated upon a process of dissolving crude mahogany sulphonates in organic solvent and then washing the solvent solution repeatedly with water. A typical solvent for dissolving the crude sulphonates is amyl alcohol; other solvents suitable for use in the process are described at a later point in the specification. In general, the solvent is of a type substantially immiscible in water so that the formation of permanent emulsions or solutions is avoided when the water is brought into contact with the sulphonate solution.

The solution of crude sulphonate and solvent preferably is made with the aid of heat, for instance, at a temperature of 120 to 140° F. Such solution is then washed with water with the aid of agitation and then is allowed to stand and separate, the heat aiding in the separation of the phases. At this stage of the process the water dissolves the inorganic salts and carries them from the solution of sulphonate and solvent when the mixture is permitted to separate. The water layer then is drawn off leaving the residual mixture comprised of mahogany sulphonates and solvent devoid of inorganic impurities. This preliminary treatment may be repeated if substantial quantities of inorganic impurities are present in the crude material.

Next, the admixture of solvent and sulphonate derived from the first water treatment is subjected again to washing with water, and the solution is again permitted to separate. However, in this second step certain organic impurities contained in the sulphonates are dissolved by the water, and upon removal of the wash water containing the organic impurities the sulphonates in the solvent are left in purer condition. At this stage the sulphonates may be recovered for usage either by evaporation of the solvent or other suitable means. Such sulphonates will contain all or substantially all of the entrained oil which was present originally in the crude material, but they will be devoid of inorganic salts and a substantial portion of the organic impurities will have been removed.

Each successive treatment of the batch of sulphonates and solvent with water will effect still further removal of organic sulphonic impurities. The result of these operations is removal, in the aqueous phase successively, first of the inorganic salts then the dark colored water soluble sulphonates and those oil soluble sulphonates which have the highest degree of water solubility. The solvent phase thereupon contains the oil soluble sulphonates in oil freed from inorganic salts and water soluble sulphonates.

In the commercial process the batch is treated with water once or a number of times after removal of the inorganic salts, depending upon the degree of purity, the color, or the emulsifying properties which may be desired in the usage for which the purified sulphonates are intended. The total number of extractions or water washes may vary from 2 to 10; usually 3 to 6 extractions are sufficient. A layer of mahogany sulphonates derived from petroleum or fractions thereof such as lubricating stock, shale oil, brown coal tar oils and the like all respond favorably to this treatment.

In the washing process water is added to the solvent solution and is agitated therewith, the suitable ratios of water to mahogany per washing being in the ratio of approximately .3 to 4 parts of water to each part of sulphonate in the solution, and preferably between .5 and 2 parts.

At no stage in the present process does the presence of oil in the crude sulphonates prevent their purification. The oil consequently need not be removed from the crude materials to be purified. The agitation of the water with the solvent solution is continued until an intimate mixture is obtained so as to permit the water to come into contact with and dissolve the impurities intended to be removed. In most cases separation of the water and dissolved impurities from the solvent sulphonate mixture is quite rapid. For instance, in the typical commercial application of the process the separation is continued most easily simply by permitting the mixture to stand in quiescent state after agitation has been discontinued. In this manner the water-impurity phase separates as a layer from the sulphonate and solvent phase. Thereafter the water layer may be removed from the solvent-sulphonate layer.

The solvent chosen for the process need be selected first in relation to its solubility in water, second in relation to its boiling point, and third in relation to its cost. The boiling point is such that the solvent can be recovered economically by distillation for use in the treatment of another batch of material without adversely affecting the sulphonates.

Solvents adapted for the fractionation of water soluble sulphonates from oil soluble sulphonates and oil are those with which the oil soluble sulphonates and oil are completely miscible, but which have a relatively poor solvent action on water soluble sulphonates and inorganic salts. Suitable solvents, for instance, are n-butyl alcohol, sec.-butyl alcohol, n-amyl alcohol, sec.-amyl alcohol, iso-amyl alcohol, the mixed isomers of amyl alcohol, as in fusel oil, tertiary amyl alcohol, 2-ethyl butyl alcohol, methyl amyl alcohol, octyl alcohol, benzyl alcohol, ethyl acetate, n-butyl acetate, sec.-butyl acetate, isopropyl acetate, the acetate of glycol mono ethyl ether, known as "Cellosolve" acetate, methyl ethyl ketone, methyl n-amyl ketone, ethyl ether, isopropyl ether, a mixture of tertiary amyl alcohol and n-heptane, etc. In general any stable, polar organic solvent or mixture of polar and nonpolar solvents having predominantly polar characteristics, liquid at ordinary temperature, containing from 4 to 8 carbon atoms, which is substantially immiscible with water may be used in the application of this invention. This classification includes aliphatic and aromatic alcohols, esters, ketones and ethers, or mixtures thereof and mixtures of alcohols and hydrocarbons falling within the above described limits.

All of the foregoing solvents are suitable for the practice of the present invention although, of course, not all are as commercially suitable as amyl alcohol either because of their cost, their boiling point, or their properties with respect both to water alone and water in the presence of sulphonic bodies. Moreover, since the composition of crude sulphonates varies somewhat in relation to the oil or petroleum fraction from which they were derived, some of the solvents are more suitable for the treatment of sulphonate derived from one source than from another. It is believed that those skilled in the art readily will understand these variations.

The addition of sulphonates to a solvent tends to increase the mutual solubility of the solvent and water. This effect becomes more pronounced after the removal of inorganic salts. To overcome this effect it is necessary to so adjust the ratio of solvent to sulphonates and oil so that complete miscibility does not occur on addition of water. With those solvents which have a low solubility in water, not to exceed 2.5%, together with a relatively high solubility for water, from 5 to 12%, satisfactory results can be obtained by maintaining a ratio of solvent to commercial sulphonates in excess of 3 and preferably between 3 and 6. With those solvents which have a solubility for water in excess of 12% larger ratios of solvent to sulphonates must be maintained, preferably between 5 and 10.

If the oil soluble sulphonates in solution with a given solvent selected from the foregoing group tend to transfer to the water layer in substantial quantities after the solution has been washed with water, such a tendency may be overcome by the addition of an electrolyte such as sodium sulphate. The electrolyte tends to prevent the removal of excessive amounts of oil soluble sulphonates from the solution being washed but does not substantially retard the dissolution or separation of water soluble sulphonates. The amount of electrolyte added should be such that it does not tend to prevent dissolution or discharge or water soluble sulphonates from the water layer and, in general, should not exceed 2% by weight of the wash water to which it is added.

COUNTERCURRENT WASHING

Instead of subjecting the solution of sulphonates and solvent with fresh water for each extraction a countercurrent extraction process may be utilized. In this technique the water containing least impurities is used to extract the most purified solution of sulphonates and, conversely, water containing the greatest concentration of impurities is employed to extract the solution of sulphonates containing impurities in the greatest concentration.

This method is particularly useful when commercial sulphonates containing substantial quantities of so-called "peppery" sludge or water soluble sulphonates are to be purified. The preliminary salt washes can also be carried out in the countercurrent extraction. The countercurrent extraction method gives a higher yield of purified sulphonates, and since less water is utilized, the cost of purification is reduced.

The following examples illustrate the practice of the invention:

EXAMPLE 1.—*The fractionation of mahogany sulphonates in amyl alcohol*

One part of oil soluble sulphonates is dissolved with the aid of heat and stirring in 3.5 parts of amyl alcohol, the final temperature being about 120 to 140° F. Then an amount of wash water equal to about ⅓ of the weight of the oil soluble sulphonate used is added, thoroughly agitated with the amyl alcohol solution and allowed to stand. Separation is quite rapid, and, when complete, the water solution is drawn off. This water wash contains mostly inorganic salts. The presence of the salts tends to prevent the separation of any appreciable quantity of sludge sulphonates. A second quantity of wash water about equal to the weight of the sulphonates is added and the solution again agitated, settled, and drawn off as previously described. This wash contains only very small amounts of inorganic salts and oil soluble sulphonates but contains the major portion of the water soluble sulphonates originally present in, and admixed with the oil soluble sulphonates. A final wash is given with a second quantity of water. This wash contains the remainder of the water soluble sludge sulphonates and usually also contains a small portion of the oil soluble sulphonates. The amyl alcohol is then evaporated using both closed and open steam, the oil soluble sulphonates freed from sludge sulphonates, remaining in the evaporator.

This procedure also is suitable for the processing of a typical crude oil soluble sulphonate which may contain about 5–6% of inorganic salts and about 2–3% or more of sludge sulphonates. In case greater quantities of impurities are present additional washes or increased volumes of water for each wash may be required.

EXAMPLE 2

About 300 parts of commercial oil soluble mineral oil sulphonate were heated with about 1050 parts of normal amyl alcohol. This solution was washed repeatedly with portions of water. The water solutions and the final alcohol solutions were evaporated, and color of the water soluble residues determined by reading the color of a water solution with the Lovibond colorimeter. The colors of the original oil soluble sulphonates, the oil soluble extracts and the final oil soluble sulphonate were determined in 10% solution in white mineral oil.

The following results were obtained:

| Wash No. | Parts water used | Extract | Color | |
|---|---|---|---|---|
| | | Percent | | |
| 1 | 150 | 7.0 | 35/20 | 10% sol. in water |
| 2 | 100 | .4 | 35/47 | 2.5% sol. in water |
| 3 | 100 | .73 | 35/45 | 1% sol. in water |
| 4 | 100 | 3.2 | 70/33 | 10% in white oil |
| 5 | 150 | 4.7 | 70/26 | 10% in white oil |
| 6 | 150 | 5.6 | 35/13.5 | 10% in white oil |
| 7 | 150 | 4.5 | 35/8.5 | 10% in white oil |
| Remaining oil sol. sulphonate. | | 73.2 | 35/4 | 10% in white oil |
| Original sulphonate | | | 35/16.5 | 10% in white oil |

EXAMPLE 3.—*A simple procedure using normal amyl alcohol*

A solution prepared as described in Example 2 was washed with 100 parts of water to remove salts then with 300 parts of water to remove most of the dark colored sulphonates, followed with 300 parts to remove the last portions of sludge sulphonates. The oil soluble sulphonate remaining amounted to 83% of the original sulphonate, and a 10% solution in white oil exhibited a color of 35 yellow, 5.4 red. When poured into water the white oil solution produced a permanent white emulsion. The third extract when evaporated amounted to about 9.7% of the original material. This extract was dissolved in 5 parts of fresh amyl alcohol and washed with water, the alcohol solution upon evaporation yielded 6.5%, based on the original sulphonate of light colored sulphonate. The total recovery amounted therefore to 89.5%. The loss amounting to 10.5% consisted of about 7.5% of salts, 2.0% of water soluble sludge sulphonate and 1% of oil soluble sulphonates.

EXAMPLE 4.—*Extraction of mahogany sulphonates in tertiary amyl alcohol*

Tertiary amyl alcohol dissolves 17.0% of water as compared to 8.1% for amyl alcohol from fusel oil. To prevent complete miscibility of the water and tertiary amyl alcohol it is desirable to use a more dilute solution of oil soluble sulphonate with this solvent.

100 parts of oil soluble sulphonates were dissolved in 500 parts of tertiary amyl alcohol. The heated solution was washed four times with about 80 parts of water. The original sulphonate had a color 10% in white oil of 35Y/16.OR. A yield of 66.5% of oil soluble sulphonates having a color of 35Y/4R was obtained.

EXAMPLE 5.—*Extraction of mahogany sulphonates in normal butyl alcohol*

100 parts of commercial soluble sulphonates are dissolved in 600 parts of normal butyl alcohol and washed five times with 100 parts each of water. The sulphonate recovered amounted to 84% and had a color of 35Y/5.2R in 10% white oil solution.

EXAMPLE 6.—*Fractionation of mahogany sulphonates in "Cellosolve" acetate*

About 100 parts of commercial sulphonates were dissolved in 600 parts of "Cellosolve" acetate (ethylene glycol mono ethyl ether acetate). This solution was washed four times with 100 parts of water drawing off the water after each addition. The solution remaining was evaporated yielding 71.2 parts of sulphonate having a color of 30 yellow by 5.0 red Lovibond, when dissolved 10% in white oil.

EXAMPLE 7.—*Fractionation of commercial sulphonates in isopropyl acetate*

1 part of crude sulphonate is dissolved in approximately 6 parts of isopropyl acetate. This solution is washed with an equal part of water. The next wash water is a 2% solution of sodium sulphate, and the succeeding water a solution of 1½% of sodium sulphate. The addition of the sodium sulphate prevents oil soluble sulphonates in appreciable quantities from dissolving in the water layer. Commercial fractionation, in accordance with this example, yielded 72% oil soluble sulphonate having a color of 30 yellow, 6.5 red in 10% white oil solution.

This application is a continuation-in-part of our copending application Serial No. 133,650, filed March 29, 1937.

Having described our invention, we claim:

1. A process for removing inorganic and organic impurities from crude mahogany sulphonates, which process comprises dissolving crude mahogany sulphonates in a volatile, organic solvent which is substantially immiscible with water and which contains 4 to 8 carbon atoms, treating such solvent solution with water to remove inorganic impurities and salts, next, treating the solvent solution, from which the inorganic salts have been removed, again with water to remove organic impurities, and finally recovering mahogany sulphonates from the solution remaining after such water treatments by separating the mahogany sulphonates from the solvent.

2. A process for removing inorganic salts and organic water-soluble sulphonates from crude mahogany sulphonates, which process comprises dissolving crude mahogany sulphonates in a volatile, organic solvent containing 4 to 8 carbon atoms and being substantially immiscible with water, then adding water to said solution to cause dissolution of inorganic salts thereof in the water, thereafter permitting the water containing the dissolved inorganic salts to separate from the solution of sulphonates in solvent, next adding water to the solution of sulphonates in solvent from which inorganic impurities have been removed, and causing the water to dissolve water-soluble sulphonates from the solution, then separating the water containing the dissolved water-soluble sulphonates from the solution of sulphonates and solvent, and finally removing the solvent from the sulphonates so purified.

3. A process for removing inorganic salts and water-soluble sulphonates from crude mahogany sulphonates, which process comprises dissolving crude mahogany sulphonates in a volatile, organic solvent of the group consisting of aliphatic and aromatic alcohols, esters, ketones and ethers which are substantially immiscible with water and which contain from 4 to 8 carbon atoms, adding water to such solution, agitating the water with the solution to effect dissolution of inorganic salts of the solution in the water, separating the water containing the dissolved inorganic salts from the solution, further treating the solution of solvent and sulphonates from which inorganic impurities have been removed with water, and agitating the water therewith to cause the water to dissolve water-soluble sulphonates from the solution, and separating the water containing the dissolved water-soluble sulphonates from the solution.

4. A process for removing inorganic salts and water-soluble sulphonates from crude mahogany sulphonates, which process comprises dissolving crude mahogany sulphonates in a volatile, organic solvent of the group consisting of aliphatic and aromatic alcohols, esters, ketones and ethers containing from 4 to 8 carbon atoms, adding water to such solution, agitating the water with the solution to effect dissolution of inorganic salts of the solution in the water, then separating the water containing the dissolved inorganic salts from the solution, further treating the solution of solvent and sulphonate from which inorganic impurities have been removed with water, and agitating the water therewith to cause the water to dissolve water-soluble sulphonates from the solution, and finally separating the water containing the dissolved water-soluble sulphonates from the solution, the said further treatment with water being accomplished in a plurality of steps, each step consisting of the treatment of solution obtained in the preceding step with water and in the separation of the water and impurities dissolved in it from the solution before water is added for the next successive treatment.

5. A process for removing inorganic salts and water-soluble sulphonates from crude mahogany sulphonates, which comprises dissolving crude mahogany sulphonates in a volatile, organic solvent which is substantially immiscible with water, which contains from 4 to 8 carbon atoms, and which exhibits predominately polar characteristics, treating such solution with water, and agitating the water therewith for dissolution of inorganic salt impurities of the crude mahogany sulphonates in the water, separating the water containing such impurities from the solution, then subjecting the said solution again with water and agitating the water therewith to enable the water to dissolve water-soluble sulphonates of the solution, and separating the water containing the dissolved water-soluble sulphonates from the solution.

6. A process for removing inorganic salts and water-soluble sulphonates from crude mahogany sulphonates, which comprises dissolving crude mahogany sulphonates in a volatile, organic solvent which is substantially immiscible with water, which contains from 4 to 8 carbon atoms, and which exhibits predominately polar characteristics, treating such solution with water, agitating the water therewith for dissolution of inorganic salt impurities of the crude mahogany sulphonates in the water, separating the water containing such impurities from the solution, subjecting the said solution again with water and agitating the water therewith to enable the water to dissolve water-soluble sulphonates of the solution, and then separating the water containing the dissolved water-soluble sulphonates from the solution, the said treatments of the solution being carried out while the solution of solvent and sulphonates being treated is at a temperature of approximately 120 to 140 deg. F.

7. A process for removing inorganic salts and water-soluble sulphonates from crude mahogany sulphonates, which process comprises dissolving crude mahogany sulphonates in a solvent consisting predominately of the mixed isomers of amyl alcohol, treating such solvent solution with water and thereby dissolving inorganic salts of the solution in the water, separating the water containing the dissolved inorganic salts from the solution, treating the solution again with water, and agitating the water therewith, thereby effecting dissolution of water-soluble sulphonates of the solution in the water, and separating the water containing dissolved water-soluble sulphonates from the solution.

8. A process for removing inorganic salts and water-soluble sulphonates from crude mahogany sulphonates, which process comprises dissolving crude mahogany sulphonates in a solvent consisting predominately of the mixed isomers of amyl alcohol, treating and agitating such solvent solution with water and thereby dissolving inorganic salts of the solution in the water, separating the water containing the dissolved inorganic salts from the solution, then treating the solution again with water, and agitating the water therewith, thereby effecting dissolution of water-soluble sulphonates of the solution in the water, and separating the water containing dissolved water-soluble sulphonates from the solution, the said treatment of the solvent sulphonate solution with water for removal of water-soluble sulphonates being conducted in a plurality of successive steps, the water containing the dissolved impurities being separated and removed from the solution before addition of water in the next successive step.

9. A process for removing inorganic salts and water-soluble sulphonates from crude mahogany sulphonates, which process comprises dissolving crude mahogany sulphonates in a solvent consisting predominately of the mixed isomers of amyl alcohol, treating such solvent solution with water and agitating the water therewith, thereby dissolving inorganic salts of the solution in the water, separating the water containing the dissolved inorganic salts from the solution, then treating the solution again with water, and agitating the water therewith, thereby effecting dissolution of water-soluble sulphonates of the solution in the water, and separating the water containing dissolved water-soluble sulphonates from the solution.

10. A process for removing inorganic and organic impurities from crude mahogany sulphonates, which process comprises dissolving crude mahogany sulphonates in a volatile, organic solvent which is substantially immiscible with water and which contains 4 to 8 carbon atoms, treating such solvent solution with water and then removing such water from solution to remove inorganic impurities and salts, next adding water to the solvent solution from which the inorganic salts have been removed, agitating it therewith and then likewise removing the water so as to remove organic impurities, and finally recovering mahogany sulphonates from the solution remaining after such water treatments by separating the mahogany sulphonates from the solvent, the ratio of solvent added to crude mahogany sulphonate being from 3 to 10 parts of solvent to each part of crude mahogany sulphonate by volume.

11. A process for removing inorganic and organic impurities from crude mahogany sulphonates, which process comprises dissolving crude mahogany sulphonates in a volatile, organic solvent which is substantially immiscible with water and which contains 4 to 8 carbon atoms, treating such solvent solution with water and then removing such water from the solution so as to remove inorganic impurities and salts, next treating the solvent solution, from which the inorganic salts have been removed, again with water and likewise removing such water from the solution so as to remove organic impurities, and finally recovering mahogany sulphonates from the solution remaining after such water treatments by separating the mahogany sulphonates from the solvent, the amount of water used, per treatment, being in the ratio of approximately .3 to 4 parts of water to each part of mahogany sulphonate, by volume, in the solvent solution.

12. A process for removing inorganic and organic impurities from crude mahogany sulphonates, which process comprises dissolving crude mahogany sulphonates in a volatile, organic solvent which is substantially immiscible with water and which contains 4 to 8 carbon atoms, treating such solvent solution with water and then separating therefrom the water from the solution to remove inorganic impurities and salts, next treating the solvent solution, from which the inorganic salts have been removed, repeatedly with water to remove organic impurities and likewise removing such water from the solution after each repeated treatment, and finally recovering mahogany sulphonates from the solution remaining after such water treatments by separating the mahogany sulphonates from the solvent, the amount of water being used, per treatment, being in the preferred range of approximately .5 to 2 parts of water to each part of mahogany sulphonate, by volume, in the solvent solution.

13. A process for removing inorganic and organic impurities from crude mahogany sulphonates, which process comprises dissolving crude mahogany sulphonates in a volatile, organic solvent which is substantially immiscible with water and which contains 4 to 8 carbon atoms, adding water to, agitating, and then removing water from such solvent solution to remove inorganic impurities and salts, next likewise treating the solvent solution, from which inorganic salts have been removed, again with water to remove organic impurities, and finally recovering mahogany sulphonates from the solution remaining after such water treatments, by separating the mahogany sulphonates from the solvent, the amount of solvent being used in dissolving the crude mahogany sulphonate being in the ratio of approximately 3 to 10 parts of solvent, by volume, for each part of crude mahogany sulphonate, by volume, and the amount of water being used, per treatment, being in the ratio of approximately .3 to 4 parts of water, to each part, by volume, of sulphonate in solvent solution.

14. A process for removing inorganic and organic impurities from crude mahogany sulphonates, which process comprises dissolving crude mahogany sulphonates in fusel oil, in the proportion of approximately 3 to 10 parts of fusel oil to each part of sulphonate, by volume, then adding water to such solution, in the proportion of approximately .3 to 4 parts of water to each part of crude sulphonate in said solution, and agitating the water with the solution for a period of time sufficient to enable the water to dissolve inorganic salts present in the crude sulphonates, thereafter permitting the water containing the dissolved inorganic salts to separate from the solution, and finally recovering the solution from the separated water containing the inorganic impurities.

15. A process for removing inorganic and organic impurities from crude mahogany sulphonates, which process comprises dissolving crude mahogany sulphonates in fusel oil, in the proportion of approximately 3 to 10 parts of fusel oil to each part of crude sulphonate, by volume, then adding water to such solution, in the proportion of approximately .3 to 4 parts of water to each part of crude sulphonate, by volume, in said solution, agitating the water with the solution for a period of time sufficient to enable the water to dissolve inorganic salts present in the crude sulphonates, thereafter permitting the water containing the dissolved inorganic salts to separate from the solution, and finally recovering the solution from the separated water containing the inorganic impurities, the said treatment of the solution with water being conducted at a temperature in the range of approximately 120 to 140 deg. F.

16. A process for removing inorganic and organic impurities from crude mahogany sulphonates, which process comprises dissolving crude mahogany sulphonates in fusel oil in the proportion of approximately 3 to 10 parts of fusel oil to each part of sulphonate, by volume, adding water to such solution, in the proportion of approximately .3 to 4 parts of water to each part of crude sulphonate, by volume, in said solution, agitating the water with the solution for a period of time sufficient to enable the water to dissolve inorganic salts present in the crude sulphonates, thereafter permitting the water containing the dissolved inorganic salts to separate from the solution, and finally recovering the solution from the separated water containing the inorganic impurities, the said treatment of the solution with water being conducted at a temperature in the range of approximately 120 to 140 deg. F., then repeating the treatment with water upon the recovered solution of solvent and sulphonate for removing water-soluble sulphonates therefrom.

17. A process for removing inorganic and organic impurities from crude mahogany sulphonates, which process comprises dissolving crude mahogany sulphonates in a volatile, organic solvent which is substantially immiscible with water and which contains from 4 to 8 carbon atoms, treating such solution with water and agitating the water therewith for a period of time sufficient to enable the water to dissolve water-soluble inorganic salts from the solvent solution, separating the water containing the inorganic salts from the solution and recovering the solution from the separated water, then treating the recovered solution with water, and agitating the water therewith for effecting dissolution of water-soluble sulphonates from the solution, an electrolyte being added to the water used for treating the said recovered solvent solution for the purpose of controlling the transference of oil-soluble sulphonates to the water without substantially diminishing the transference of water-soluble sulphonates to the water.

18. A process for removing inorganic and organic impurities from crude mahogany sulphonates, which process comprises dissolving crude mahogany sulphonates in a volatile, organic solvent which is substantially immiscible with water and which contains from 4 to 8 carbon atoms, treating such solution with water and agitating the water therewith for a period of time sufficient to enable the water to dissolve water-soluble inorganic salts from the solvent solution, separating the water containing the inorganic salts from the solution and recovering the solution from the separated water, treating the recovered solution with water, and agitating the water therewith for effecting dissolution of water-soluble sulphonates from the solution, an electrolyte being added to the water used for treating the said recovered solvent solution for the purpose of controlling the transference of oil-soluble sulphonates to the water, the amount of electrolyte added not substantially exceeding 2%, and in no case being sufficient to substantially prevent dissolution of water-soluble sulphonates of the solvent solution in the water.

CHARLES J. LOHMAN.
LATIMER D. MYERS.